(12) United States Patent
Seleznev et al.

(10) Patent No.: US 11,788,402 B2
(45) Date of Patent: Oct. 17, 2023

(54) METHODS FOR DETERMINING A VOLUME FRACTION OF WATER AND WATER SALINITY IN ORGANIC SHALE RESERVOIRS USING MULTI-FREQUENCY DIELECTRIC WELL LOGGING MEASUREMENTS

(71) Applicant: Schlumberger Technology Corporation, Sugar Land, TX (US)

(72) Inventors: Nikita Seleznev, Cambridge, MA (US); Tarek M. Habashy, Burlington, MA (US); Michel Claverie, Le Chesnay (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 221 days.

(21) Appl. No.: 16/923,559

(22) Filed: Jul. 8, 2020

(65) Prior Publication Data
US 2021/0010367 A1    Jan. 14, 2021

Related U.S. Application Data

(60) Provisional application No. 62/871,703, filed on Jul. 8, 2019.

(51) Int. Cl.
| | |
|---|---|
| *E21B 47/003* | (2012.01) |
| *E21B 49/08* | (2006.01) |
| *G01V 3/38* | (2006.01) |
| *G01V 3/34* | (2006.01) |
| *E21B 47/13* | (2012.01) |

(52) U.S. Cl.
CPC ............ *E21B 47/003* (2020.05); *E21B 47/13* (2020.05); *E21B 49/08* (2013.01); *G01V 3/34* (2013.01); *G01V 3/38* (2013.01)

(58) Field of Classification Search
None
See application file for complete search history.

(56) References Cited

U.S. PATENT DOCUMENTS

| | | | | |
|---|---|---|---|---|
| 3,849,721 | A * | 11/1974 | Calvert ................... | G01V 3/30 324/338 |
| 3,944,910 | A * | 3/1976 | Rau .......................... | G01V 3/30 324/338 |
| 4,704,581 | A * | 11/1987 | Clark ..................... | H01Q 13/18 343/767 |

(Continued)

OTHER PUBLICATIONS

J. O. Alvarez and F. Peñaranda-Foix, "Multi-Frequency Microwave Resonance Cavity for Nondestructive Core Plug Measurements," IGARSS 2018—2018 IEEE International Geoscience and Remote Sensing Symposium, 2018, pp. 1028-1031, doi: 10.1109/IGARSS.2018.8519216 (Year: 2018).*

(Continued)

*Primary Examiner* — Lina Cordero
(74) *Attorney, Agent, or Firm* — Ashley E. Brown

(57) ABSTRACT

The subject disclosure relates to a method for determining a volume fraction of water and water salinity in organic shales and other geological formations. The method includes a knowledge of complex formation permittivity at several frequencies and minimizes or excludes dependency on external parameters, such as the permittivity of the formation mineral phase.

20 Claims, 5 Drawing Sheets

(56) References Cited

U.S. PATENT DOCUMENTS

| | | | | |
|---|---|---|---|---|
| 5,243,290 | A | * | 9/1993 | Safinya .............. G01V 3/30 324/338 |
| 5,345,179 | A | * | 9/1994 | Habashy ............. G01V 3/30 702/7 |
| 5,434,507 | A | * | 7/1995 | Beren ................. G01V 3/30 324/338 |
| 7,376,514 | B2 | | 5/2008 | Habashy et al. |
| 2007/0061083 | A1 | * | 3/2007 | Habashy ............. G01V 3/26 702/11 |
| 2014/0298900 | A1 | * | 10/2014 | Clarke ............... E21B 49/00 73/152.55 |
| 2016/0299092 | A1 | * | 10/2016 | Dorovsky ........... G01V 3/28 |
| 2017/0176624 | A1 | * | 6/2017 | Donadille .......... E21B 47/00 |
| 2018/0321412 | A1 | * | 11/2018 | Wang ............... G01N 27/026 |
| 2019/0204466 | A1 | * | 7/2019 | Zhang .............. G01V 3/30 |

OTHER PUBLICATIONS

Bergman, "The dielectric constant of a composite material—a problem in classical physics", Physics Reports, 43(9), 1978, pp. 377-407.

Calvert et al., "Electromagnetic propagation . . . A new dimension in logging", Society of Petroleum Engineers of AIME, SPE 6542, 1977, 15 pages.

Carmona et al., "Zapping Rocks", Oilfield Review, 23(1), 2011, pp. 36-52.

Craddock et al., "Integrating Measured Kerogen Properties with Log Analysis for Petrophysics and Geomechanics in Unconventional Resources", In SPWLA 59th Annual Logging Symposium. Society of Petrophysicists and Well-Log Analysts, Jun. 2-6, 2018, 19 pages.

Desai and Moore, "Equivalent NaCl concentrations from ionic concentrations", The Log Analyst, May/Jun. 1969, pp. 12-21.

Dutton et al., "Play analysis and leading-edge oil-reservoir development methods in the Permian basin: increased recovery through advanced technologies", AAPG Bull. 89, No. 5, May 2005, pp. 553-576.

Engle et al., "Geochemistry of formation waters from the Wolfcamp and "Cline" shales: Insights into brine origin, reservoir connectivity, and fluid flow in the Permian Basin, USA", Chemical Geology, vol. 425, 2016, pp. 76-92.

Gregory and Clarke, "Tables of the Complex Permittivity of Dielectric Reference Liquids at Frequencies up to 5 GHz", NPL Report MAT 23, National Physical Laboratory, Jan. 2012, 94 pages.

Herron et al., "Kerogen content and maturity, mineralogy and clay typing from DRIFTS analysis of cuttings or core", Petrophysics, 55(05), Oct. 2014, pp. 435-446.

Herron et al., "Dual-range FT-IR mineralogy and the analysis of sedimentary formations", paper SCA-9729, 1997, pp. 7-10.

Hizem et al., "Dielectric dispersion: A new wireline petrophysical measurement", SPE 116130, In SPE Annual Technical Conference and Exhibition, Society of Petroleum Engineers, 2008, 21 pages.

Klein and Swift, "An improved model for the dielectric constant of sea water at microwave frequencies", IEEE Transactions on Antennas and Propagation, 25(1), Jan. 1977, pp. 104-111.

Seleznev et al., "Dielectric mixing laws for fully and partially saturated carbonate rocks", In: SPWLA 45th Annual logging symposium, Society of Petrophysicists and Well-Log Analysts, Jun. 6-9, 2004, 14 pages.

Seleznev et al., "Matrix Permittivity Measurements for Rock Powders", SPE Reservoir Evaluation & Engineering, 19 (02), May 2016, pp. 214-225.

Seleznev et al., "Formation properties derived from a multi-frequency dielectric measurement", In: SPWLA 47th Annual Logging Symposium, Society of Petrophysicists and Well-Log Analysts, Jun. 4-7, 2006, 12 pages.

Stroud et al., "Analytical model for the dielectric response of brine-saturated rocks", Physical Review B, 34(8), Oct. 15, 1986, p. 5145-5153.

Wickard et al., "A Diagenetic Study of the Wolfcamp Shale, Midland Basin, West Texas", URTeC: 2460784, Unconventional Resources Technology Conference, San Antonio, Texas, Aug. 1-3, 2016, 15 pages.

Brown, 1980, "Connection between formation factor for electrical resistivity and fluid-solid coupling factor in Biots' equations for acoustic waves in fluid-filled porous media", Geophysics 45(8), pp. 1269-1275.

* cited by examiner

METHODS FOR DETERMINING A VOLUME FRACTION OF WATER AND WATER SALINITY IN ORGANIC SHALE RESERVOIRS USING MULTI-FREQUENCY DIELECTRIC WELL LOGGING MEASUREMENTS

CROSS-REFERENCE TO RELATED APPLICATIONS

This application claims benefit of priority from U.S. Provisional Patent Application Ser. No. 62/871,703, entitled "METHODS FOR DETERMINING A VOLUME FRACTION OF WATER AND WATER SALINITY IN ORGANIC SHALE RESERVOIRS USING MULTI-FREQUENCY DIELECTRIC MEASUREMENTS," as filed on Jul. 8, 2019, herein incorporated by reference in its entirety.

FIELD

The subject disclosure relates to the field of geological formation evaluation that determines characteristics of formations surrounding an earth borehole and, more particularly, to methods that characterize properties of water of formations based on multi-frequency dielectric well logging measurements.

BACKGROUND

Importance of organic shale reservoirs has grown significantly in the recent past. At present, approximately 60% of the U.S. hydrocarbon production originates from organic shale plays. However, these reservoirs present unique formation evaluation challenges that often cannot be readily addressed with the existing techniques.

Hydrocarbon content is the key parameter in the evaluation of reservoir quality. Owing to the complex lithology, texture, and wettability of organic shale reservoirs, conventional methods of estimating hydrocarbon content can be unreliable. Commonly used resistivity-based methods were not developed for shale formations. Moreover, they require empirical parameters, such as Archie's cementation and saturation exponents, that are generally unknown and variable in shale reservoirs. Other methods, such as nuclear-based sigma logging, can also be challenging to apply in the complex lithologies.

Shale reservoirs present a unique opportunity for dielectric well logging. Dielectric well logging is sensitive to the water content and provides water saturation without having to know Archie's empirical parameters, as is required with resistivity log interpretation. Moreover, because of the extremely low permeability of the shale reservoirs, there is effectively no invasion of the borehole fluids into the formation. Thus, in these reservoirs, dielectric dispersion directly provides the water saturation of the undisturbed zone.

Conventional methods to determine the volume fraction of water from the dielectric well log requires the permittivity of the mineral phase as an input (See Seleznev et al., "Dielectric mixing laws for fully and partially saturated carbonate rocks", In SPWLA 45th Annual logging symposium, Society of Petrophysicists and Well-Log Analysts, 2015; Seleznev et al., "Formation properties derived from a multi-frequency dielectric measurement", In SPWLA 47th Annual Logging Symposium, Society of Petrophysicists and Well-Log Analysts, 2006; and Carmona et al., "Zapping Rocks", Oilfield Review, 23(1), pp.36-52, 2011.

Uncertainties in the mineral permittivity end-points or in the petrophysical solution for the volume fractions of minerals directly translate into errors in the computed permittivity of the mineral phase and in the volume fraction of water determined from the dielectric logs (See Seleznev et al., "Matrix Permittivity Measurements for Rock Powders", SPE Reservoir Evaluation & Engineering, 19(02), pp. 214-225, 2016).

This problem is especially acute in organic shale reservoirs that often exhibit complex lithologies and contain minerals and hydrocarbons, whose permittivity is not well established, such as kerogen. All these issues complicate and make more uncertain interpretation of the dielectric well logs using existing approaches.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In embodiments, methods and systems are provided for characterizing a geological formation, which involve using a downhole tool to perform multifrequency electromagnetic measurements of the formation. A plurality of complex permittivities of the formation at a plurality of frequencies is determined from the multifrequency electromagnetic measurements, and a plurality of complex permittivities of water in the formation at the plurality of frequencies is determined from the multifrequency electromagnetic measurements. A value of at least one formation parameter is determined from the plurality of complex permittivities of the formation and the plurality of complex permittivities of water in the formation. In embodiments, the at least one formation parameter can be selected from the group including water-filled porosity of the formation, water salinity, water saturation, tortuosity of water-filled pore space, and combinations thereof.

In embodiments, the plurality of complex permittivities of the formation, the plurality of complex permittivities of water in the formation and the value of the at least one formation parameter can be determined by a processor.

The method can be used for organic shale formations and quantify the at least one formation parameter without determining or providing as input information characterizing mineralogy and hydrocarbon content including kerogen of the organic shale formation.

In embodiments, the plurality of frequencies of the complex permittivities can consist of two frequencies. The water-filled porosity of the formation can be quantified by a value determined from only the real part of at least one computed expression involving complex permittivities at the two frequencies, such as $$\text{Re}\left\{\frac{\sqrt{\varepsilon_2} - \sqrt{\varepsilon_1}}{\sqrt{\varepsilon_{w2}} - \sqrt{\varepsilon_{w1}}}\right\} \text{ or } \varphi_w = \frac{\text{Re}\{\sqrt{\varepsilon_2} - \sqrt{\varepsilon_1}\}}{\text{Re}\{\sqrt{\varepsilon_{w2}} - \sqrt{\varepsilon_{w1}}\}}.$$

In this case, the water-filled porosity can be selectively determined according to the expression $$\varphi_w = \text{Re}\left\{\frac{\sqrt{\varepsilon_2} - \sqrt{\varepsilon_1}}{\sqrt{\varepsilon_{w2}} - \sqrt{\varepsilon_{w1}}}\right\}$$

based on evaluation of a quality index derived from a real part and an imaginary part of a computed expression involving complex permittivities of the formation and water in the formation at the two frequencies.

In embodiments, the quality index can have the form $$QI = \left| \text{Im}\left\{ \frac{\sqrt{\varepsilon_2} - \sqrt{\varepsilon_1}}{\sqrt{\varepsilon_{W2}} - \sqrt{\varepsilon_{W1}}} \right\} / Re\left\{ \frac{\sqrt{\varepsilon_2} - \sqrt{\varepsilon_1}}{\sqrt{\varepsilon_{W2}} - \sqrt{\varepsilon_{W1}}} \right\} \right|.$$

In other embodiments, the water-filled porosity of the formation can be quantified by a value determined from only the imaginary unit part of at least one computed expression involving complex permittivities at the two frequencies, such as $$\varphi_w = \frac{\text{Im}\{\sqrt{\varepsilon_2} - \sqrt{\varepsilon_1}\}}{\text{Im}\{\sqrt{\varepsilon_{w2}} - \sqrt{\varepsilon_{w1}}\}}.$$

In still other embodiments, the water-filled porosity of the formation can be quantified by a value determined from an absolute value of a computed expression involving complex permittivities at the two frequencies, such as $$\varphi_w = \left| \frac{\sqrt{\varepsilon_2} - \sqrt{\varepsilon_1}}{\sqrt{\varepsilon_{w2}} - \sqrt{\varepsilon_{w1}}} \right|.$$

In embodiments, the plurality of frequencies of the complex permittivities can include at least three frequencies. Water salinity of the formation can be quantified by a value determined from complex permittivities of the formation at the at least three frequencies and complex permittivities of water in the formation at the at least three frequencies.

In embodiments, the value of water salinity of the formation can be determined from an inversion operation that uses a dispersion model to represent complex permittivities of water in the formation at the at least three frequencies in terms of the DC resistivity of water and water temperature and solves for DC resistivity of water and water temperature.

In embodiments, the inversion operation can solve for DC resistivity of water and water temperature using at least one of the following expressions $$\frac{\sqrt{\varepsilon_2} - \sqrt{\varepsilon_1}}{\sqrt{\varepsilon_3} - \sqrt{\varepsilon_2}} = \frac{\sqrt{\varepsilon_{w2}} - \sqrt{\varepsilon_{w1}}}{\sqrt{\varepsilon_{w3}} - \sqrt{\varepsilon_{w2}}},$$

$$\frac{\text{Im}(\sqrt{\varepsilon_3})}{\text{Im}(\sqrt{\varepsilon_2})} = \frac{\text{Im}(\sqrt{\varepsilon_{w3}})}{\text{Im}(\sqrt{\varepsilon_{w2}})},$$

$$\frac{\text{Im}(\sqrt{\varepsilon_2})}{\text{Im}(\sqrt{\varepsilon_1})} = \frac{\text{Im}(\sqrt{\varepsilon_{w2}})}{\text{Im}(\sqrt{\varepsilon_{w1}})}, \text{ and}$$

$$\frac{\text{Im}(\sqrt{\varepsilon_3})}{\text{Im}(\sqrt{\varepsilon_1})} = \frac{\text{Im}(\sqrt{\varepsilon_{w3}})}{\text{Im}(\sqrt{\varepsilon_{w1}})}.$$

In embodiments, the at least one formation parameter can include water-filled porosity and water saturation, wherein water saturation is determined from the ratio of water-filled porosity and total porosity of the formation, wherein total porosity of the formation is determined from other measurements.

In embodiments, the at least one formation parameter can include a parameter that characterizes tortuosity of the water-filled pore space of the formation, which is determined by inversion operations using dielectric data derived from the multifrequency electromagnet measurements.

Further features and advantages of the subject disclosure will become more readily apparent from the following detailed description when taken in conjunction with the accompanying drawings.

BRIEF DESCRIPTION OF THE DRAWINGS

The subject disclosure is further described in the detailed description which follows, in reference to the noted plurality of drawings by way of non-limiting examples of the subject disclosure, in which like reference numerals represent similar parts throughout the several views of the drawings, and wherein.

DETAILED DESCRIPTION

The particulars shown herein are by way of example and for purposes of illustrative discussion of the examples of the subject disclosure only and are presented in the cause of providing what is believed to be the most useful and readily understood description of the principles and conceptual aspects of the subject disclosure. In this regard, no attempt is made to show structural details in more detail than is necessary, the description taken with the drawings making apparent to those skilled in the art how the several forms of the subject disclosure may be embodied in practice. Furthermore, like reference numbers and designations in the various drawings indicate like elements.

Figure 1:
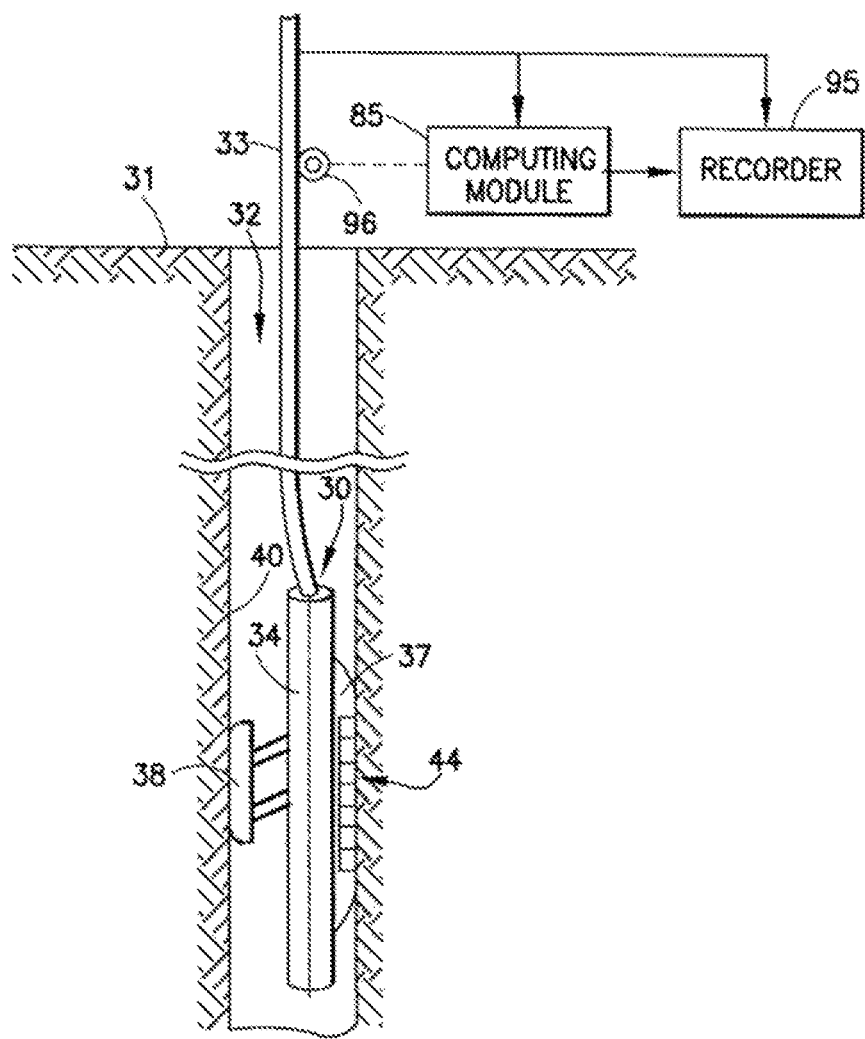
FIG. 1 is a schematic diagram of a well site system that includes a downhole logging tool, which can be used in practicing embodiments of the present disclosure.

Referring to FIG. 1, there is shown an apparatus 30, for investigating a subsurface formation 31 traversed by a borehole 32, which can be used in practicing embodiments of the present disclosure. The borehole 32 is typically filled with a drilling fluid or mud which contains finely divided solids in suspension. Generally, the fluid pressure in the formation 31 is less than the hydrostatic pressure of the column of mud in the borehole 32, so that the mud and mud filtrate flows into the formation 31 to some extent. As is well known, the formation 31 tends to screen the small particles suspended in the mud so that a mudcake 40 can form on the walls of the borehole.

The well logging device or tool 30 is suspended in the borehole 32 on an armored cable 33, the length of which substantially determines the relative depth of the device 30. The cable length is controlled by suitable means at the surface such as a drum and winch mechanism (not shown). The logging device 30 includes an elongated cylindrical sonde 34, the interior portion of which has a housing containing the bulk of the downhole electronics. A pad 37 is mounted on one side of sonde 34. The pad 37 contains an array 44 of antennae. The logging device may, for example, be of a type disclosed in U.S. Pat. No. 5,434,507, and may have features as further disclosed in U.S. Pat. Nos. 5,243,290, and 5,345,179, although other suitable devices could be used. In embodiments, the antennae array 44 includes cross-dipole antennae as disclosed in U.S. Pat. No. 5,434,507. A backup arm 38 is mounted on the other side of sonde 34. The backup arm 38 can be hydraulically controlled to maintain the pad 37 in contact with the borehole wall. The backup arm 38 can also be used to provide a caliper reading. Signals can be stored downhole by memory associated with a downhole processor, and/or some or all signals can be transmitted uphole for processing and/or storage. Electronic signals indicative of the information obtained by the well logging device 30 can be transmitted through the cable 33 to a computing module 85 and a recorder 95, located at the surface of the earth. A rotating wheel 96 can be coupled to the cable 33 to provide depth information that characterizes the relative depth of the device 30 during the logging measurements to a computing module 85 and/or recorder 95. The computing module 85 will typically include a processor, and associated memory, timing, input/output, display, and printing functions, none of which are separately shown. Also, it will be understood that some or all of log processing and/or interpretation processing can be performed at locations remote from the borehole. The device 30 or similar device can also have application to measurement while drilling or measurement while tripping.

As described herein cross-dipole antennae can be utilized in practicing embodiments hereof, as in the type of well logging devices described in the above-referenced U.S. Pat. No. 5,434,507, can be of the type disclosed in U.S. Pat. No. 5,243,290. In the U.S. Pat. No. 5,243,290, there is disclosed a cross-dipole antenna that can be energized to produce electromagnetic energy having a magnetic dipole characteristic. An embodiment of the antenna comprises a generally square aperture in a metal body. Metal probe elements cross the aperture from different opposing sides, but are notched at their centers, so as to not touch where they cross. A dielectric material fills the rest of the aperture. Each of the probes is shorted at one end to a wall of the aperture. The other end of each probe is coupled to a conductor wire which is insulated for passage through the antenna body, and is coupled with transmitter and/or receiver circuitry, depending on the intended purpose of the antenna.

In embodiments, the cross-dipole antennae can be used to produce electromagnetic energy with a controlled magnetic moment direction (or angle) as described in the U.S. Pat. No. 5,243,290.

In embodiments, the antennae can be mounted in the pad 37 as a number of one-dimensional strips of cross-dipole antennas, the strips being mounted side-by-side in the body of the pad. Alternatively, the individual cross-dipole antennas can be inserted as modules into a two-dimensional frame of square apertures. Each cross-dipole antenna element is addressable to be used as a transmitting antenna or a receiving antenna at a particular time under control of the processor.

An example of electronic circuitry for obtaining attenuation and phase shift measurements using the array of cross-dipole antennae is described in detail in the referenced U.S. Pat. No. 5,434,507. The attenuation and phase shift measurements can be processed to obtain permittivity and conductivity of the formation 31 at one or more relative depths as described in the above-referenced U.S. Pat. Nos. 3,849,721, 3,944,910, 4,704,581, 5,243,290, and 5,345,179. By making the oscillators of such electronic circuitry variable frequency oscillators (such as voltage controlled oscillators under control of the downhole processor), the attenuation and phase shift measurements can be taken at any desired frequencies, for example frequencies in the range about 100 MHz to 1 GHz.

In alternate embodiments, the well logging device 30 can be realized by the Dielectric Scanner tool of Schlumberger. Details of the Dielectric Scanner tool are provided in Hizem et al., "Dielectric dispersion: A new wireline petrophysical measurement", In SPE Annual Technical Conference and Exhibition, Society of Petroleum Engineers, 2008.

Effective permittivity of sedimentary rocks filled with water and hydrocarbons can be closely approximated by the Complex Refractive Index Method (CRIM) formula (also called Beer's mixing law) as follows:

$$\sqrt{\varepsilon_{eff}} = \phi_w\sqrt{\varepsilon_w} + \phi_{hc}\sqrt{\varepsilon_{hc}} + \phi_m\sqrt{\varepsilon_m} \qquad \text{Eqn. (1)}$$

where $\varepsilon_w$, $\varepsilon_{hc}$ and $\varepsilon_m$ are the permittivities of water, hydrocarbon and rock matrix, respectively, and $\phi_w$, $\phi_{hc}$ and $\phi_m$ are the volume fractions of water, hydrocarbon and rock matrix, respectively with $\phi_w + \phi_{hc} + \phi_m = 1$. The permittivities of hydrocarbon and matrix are represented by real numbers and non-dispersive (i.e., constant with respect to frequency). The permittivity of water is in general complex-valued due to the presence of brine and is, therefore, varying with frequency. Equation (1) can be written in terms of total porosity $\phi_t$ (which is the total pore volume per unit volume of rock) and water saturation $S_w$ (which is the ratio of water-filled pore volume to the total pore volume of the reservoir rock) as follows:

$$\sqrt{\varepsilon_{eff}} = \phi_t S_w \sqrt{\varepsilon_w} + (1-S_w)\phi_t\sqrt{\varepsilon_{hc}} + (1-\phi_t)\sqrt{\varepsilon_m}. \qquad \text{Eqn. (2)}$$

To deduce a volumetric fraction of water in a formation from the effective permittivity of the formation, one has to know the relationship (so-called mixing law) between the properties of the constituents and their mixture. Mixing laws require knowledge of the matrix and fluid complex permittivity at downhole conditions. Often it is difficult to predict these values accurately due to unknown matrix mineral composition and the resistivity of the formation water. These issues are especially problematic in organic shale reservoirs that have complex lithologies and extremely low hydraulic permeabilities prohibiting acquisition of the formation fluid samples.

The subject disclosure describes a method of estimating a volume fraction of water and water salinity in organic shale reservoirs. Co-owned U.S. Pat. No. 7,376,514, the contents of which are herein incorporated by reference in its entirety, describes a method for determining properties of earth formations using dielectric permittivity measurements. Methods of shale reservoir evaluation are demonstrated based on the Complex Refractive Index Method (See Calvert, T. J., Rau N. R., "Electromagnetic propagation. A new dimension in logging", SPE 6542), but it can also be applied to more complicated mixing laws that may have an increased number of parameters by including measurements at additional frequencies.

Knowing the DC value of the water resistivity and the temperature, the complex permittivity of water at an arbitrary frequency can be computed. In a non-limiting embodiment, such computation can use the Klein-Swift dispersion model given by:

$$\varepsilon_w(\omega), \sigma_w(\omega) = F(R_{DC}, T) \quad \text{Eqn. (3)}$$

The Klein-Swift dispersion model is described in Klein, L., and Swift, T., "An Improved Model for The Dielectric Constant of Sea Water at Microwave Frequencies", IEEE Trans: On Antennas and Propagation, Vol. AP-25, No. 1, 104-111, 1997.

The DC resistivity, $R_{DC}$, of the water can in turn be related to water temperature and salinity through well-known formulae as follows:

$$R_{DC} = F(T, \text{salinity}) \quad \text{Eqn. (4)}$$

For example, see Desai et al., "Equivalent NaCl concentrations from ionic concentrations," The Log Analyst, 1969.

Given the effective formation permittivity $\varepsilon_{eff}$ at a single frequency, equations (2) and (3) can be solved simultaneously for the estimation of water saturation $S_w$ and the formation water salinity provided that the total porosity, temperature, and permittivity of both the matrix and the hydrocarbons of the formation are known. Total porosity can be measured downhole by other logging tools (such as neutron and density logs). Borehole environmental conditions such as temperature and pressure can be measured downhole by other logging tools (such as the environmental measurement sonde (EMS) of Schlumberger), Permittivity of the matrix and the hydrocarbons of the formation are typically assumed. To eliminate the uncertainty in the determination of the permittivities of the matrix and hydrocarbons of the formation, a dielectric measurement at two different frequencies can be utilized, such as the downhole measurements provided by dielectric logging tool 30 described above with respect to FIG. 1.

In this case, the water-filled porosity $\phi_w$ can be determined using the equation:

$$\phi_w = \frac{\sqrt{\varepsilon_2} - \sqrt{\varepsilon_1}}{\sqrt{\varepsilon_{w2}} - \sqrt{\varepsilon_{w1}}} \quad \text{Eqn. (5)}$$

where $\varepsilon_2$ and $\varepsilon_1$ are the measured complex rock permittivities at frequencies $f_2$ and $f_1$, respectively, and $\varepsilon_{w2}$, $\varepsilon_{w1}$ are the corresponding computed complex permittivities for water at frequencies $f_2$ and $f_1$.

The complex rock permittivities $\varepsilon_2$ and $\varepsilon_1$ can be defined as:

$$\varepsilon = \varepsilon' + \sigma/i\omega\varepsilon_0 \quad \text{Eqn. (6)}$$

where $\varepsilon'$ is the real part of the measured rock permittivity, $\sigma$ is the rock (formation) conductivity, $\varepsilon_0$ is the vacuum permittivity, i—imaginary unit, and $\omega = 2\pi f$ where f is the measurement frequency (e.g., $f_2$ for $\varepsilon_2$ and $f_1$ for $\varepsilon_1$).

The complex water permittivities $\varepsilon_{w2}$ and $\varepsilon_{w1}$ can be defined as:

$$\varepsilon_w = \varepsilon'_w + \sigma_w/i\omega\varepsilon_0 \quad \text{Eqn. (7)}$$

where $\varepsilon'_w$ are the real part of the measured water permittivity, $\sigma_w$ is the water conductivity, $\varepsilon_0$ is the vacuum permittivity, i—imaginary unit, and $\omega = 2\pi f$ where f is the measurement frequency (e.g., $f_2$ for $\varepsilon_2$ and $f_1$ for $\varepsilon_1$).

Other forms for computing the water-filled porosity $\varphi_w$ can be obtained from equation (2) and are given by the expressions of Equations (8)-(12) as follows:

$$\varphi_w = \text{Re}\left\{\frac{\sqrt{\varepsilon_2} - \sqrt{\varepsilon_1}}{\sqrt{\varepsilon_{w2}} - \sqrt{\varepsilon_{w1}}}\right\}, \quad \text{Eqn. (8)}$$

$$\varphi_w = \frac{\text{Re}\{\sqrt{\varepsilon_2} - \sqrt{\varepsilon_1}\}}{\text{Re}\{\sqrt{\varepsilon_{w2}} - \sqrt{\varepsilon_{w1}}\}}, \quad \text{Eqn. (9)}$$

$$\varphi_w = \left|\frac{\sqrt{\varepsilon_2} - \sqrt{\varepsilon_1}}{\sqrt{\varepsilon_{w2}} - \sqrt{\varepsilon_{w1}}}\right|, \quad \text{Eqn. (10)}$$

$$\varphi_w = \frac{\text{Im}\{\sqrt{\varepsilon}\}}{\text{Im}\{\sqrt{\varepsilon_w}\}}, \text{ and} \quad \text{Eqn. (11)}$$

$$\varphi_w = \frac{\text{Im}\{\sqrt{\varepsilon_2} - \sqrt{\varepsilon_1}\}}{\text{Im}\{\sqrt{\varepsilon_{w2}} - \sqrt{\varepsilon_{w1}}\}}. \quad \text{Eqn. (12)}$$

In these equations, Re{ } represents the real part of the computed expression involving the complex permittivities at the two frequencies $f_2$ and $f_1$, and Im{ } represents the imaginary unit part of the computed expression involving the complex permittivities at the two frequencies $f_2$ and $f_1$. For equation (11), the complex permittivities $\varepsilon$, $\varepsilon_w$ can be complex permittivities of the formation and water in the formation obtained at any of the frequencies measured by the logging tool, such as any one of the pairs $\{\varepsilon_1, \varepsilon_{w1}\}$, $\{\varepsilon_2, \varepsilon_{w2}\}$, or $\{\varepsilon_3, \varepsilon_{w3}\}$, . . . for the case where the electromagnetic measurements are performed by the logging tool at three or more frequencies.

Note that equations (8), (9) and (10) are suitable for all salinities of the water that fills the water-filled porosity $\varphi_w$, and equations (11) and (12) can be suitable for moderate to high salinities (e.g., salinities above 30 ppk) of the water that fills the water-filled porosity $\varphi_w$ and may not work for low salinities (e.g., salinities below 30 ppk) of the water that fills the water-filled porosity $\varphi_w$.

Further note that a quality control index corresponding to equation (8) can be derived from the following inequality:

$$\text{Re}\left\{\frac{\sqrt{\varepsilon_2} - \sqrt{\varepsilon_1}}{\sqrt{\varepsilon_{w2}} - \sqrt{\varepsilon_{w1}}}\right\} \gg \text{Im}\left\{\frac{\sqrt{\varepsilon_2} - \sqrt{\varepsilon_1}}{\sqrt{\varepsilon_{w2}} - \sqrt{\varepsilon_{w1}}}\right\} \quad \text{Eqn. (13)}$$

The quality control index derived from the inequality of equation (13) can be evaluated to determine if it satisfies a predefined criterion. For the case that the quality control index satisfies the predefined criterion, then the formula of equation (8), e.g., $$\varphi_w = \text{Re}\left\{\frac{\sqrt{\varepsilon_2} - \sqrt{\varepsilon_1}}{\sqrt{\varepsilon_{w2}} - \sqrt{\varepsilon_{w1}}}\right\},$$

can be used to give a reliable solution to determine water-filled porosity $\varphi_w$. In this manner, the condition of the inequality of equation (13) gives a self-consistency measure that can be used in the determination of water-filled porosity $\varphi_w$.

With the total porosity, $\phi_t$, known from other measurements, the water saturation $S_w$ can be computed as:

$$S_w = \phi_w / \phi_t.\qquad\text{Eqn. (14)}$$

Once water salinity and the water-filled porosity are known, a combined value can be computed as follows:

$$\phi_{hc}\sqrt{\varepsilon_{hc}} + \phi_m\sqrt{\varepsilon_m} \text{ from: } \phi_{hc}\sqrt{\varepsilon_{hc}} + \phi_m\sqrt{\varepsilon_m} = \sqrt{\varepsilon} - \phi_w\sqrt{\varepsilon_w},\qquad\text{Eqn. (15)}$$

at any of the two frequencies ($f_1$, $f_2$). This will then allow the generation of a full dispersion curve of the formation rock from the following:

$$\sqrt{\phi_{eff}} = \phi_w\sqrt{\varepsilon_w} + \phi_{hc}\sqrt{\varepsilon_{hc}} + \phi_m\sqrt{\varepsilon_m}.\qquad\text{Eqn. (16)}$$

Figures 2A, 2B:
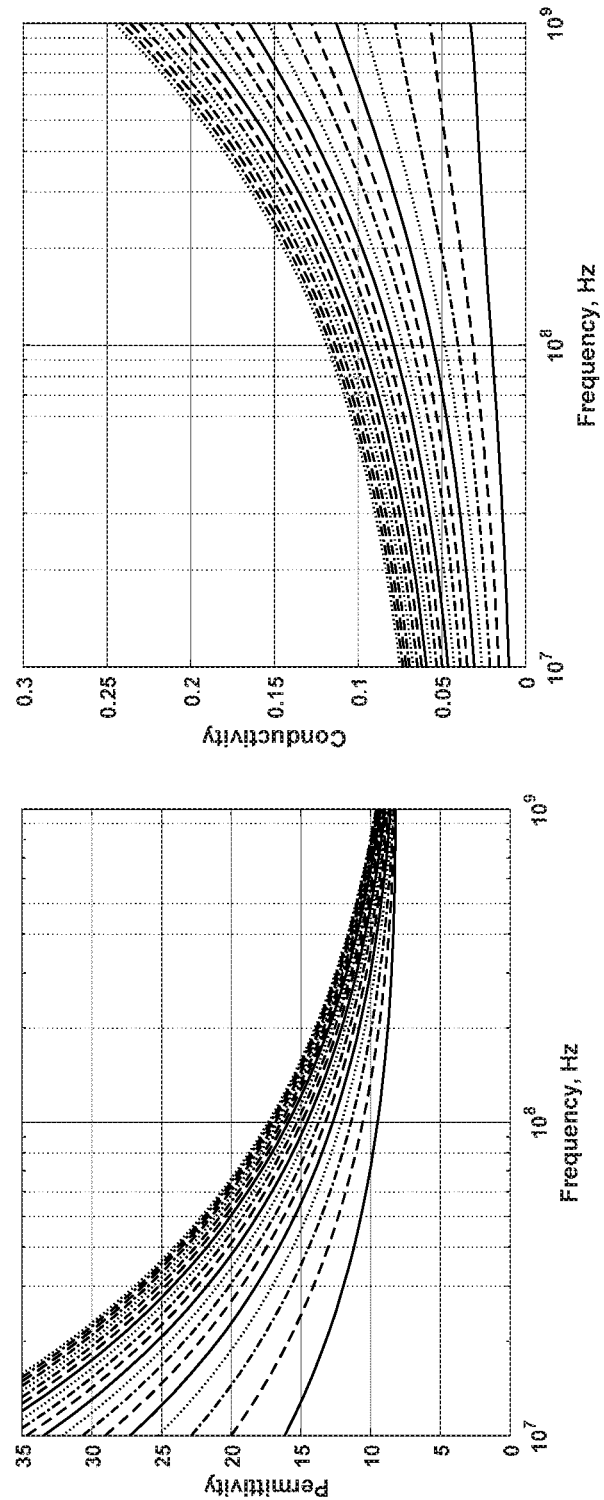
FIG. 2A depict plots of synthetic permittivity data as a function of frequency simulated with an SMD dielectric dispersion model for variable water salinity values.
FIG. 2B depicts plots of synthetic conductivity data as a function of frequency simulated with the same SMD dielectric dispersion model and variable water salinity values.

The proposed method of shale evaluation is further demonstrated on synthetic data generated using an SMD dielectric dispersion model (See Stroud et al., "Analytical model for the dielectric response of brine-saturated rocks", Physical Review B, 34(8), p.5145, 1986.). The parameters of the SMD dielectric dispersion model are representative of a real organic shale sample dielectric response. Synthetic dielectric dispersion data was generated over a range of water salinities from 10 ppk to 200 ppk that was wide enough to include water salinity of most organic shale reservoirs. Modeled dielectric dispersion curves of permittivity and conductivity are shown in FIGS. 2A and 2B, respectively. Permittivity and conductivity data corresponding to two frequencies $f_1$ and $f_2$ in the range of 100 MHz -1 GHz were used to demonstrate the methods described by equations (8)-(12). The higher of the two frequencies is designated as $f_1$ and the lower frequency of the two is designated as $f_2$.

Figure 3:
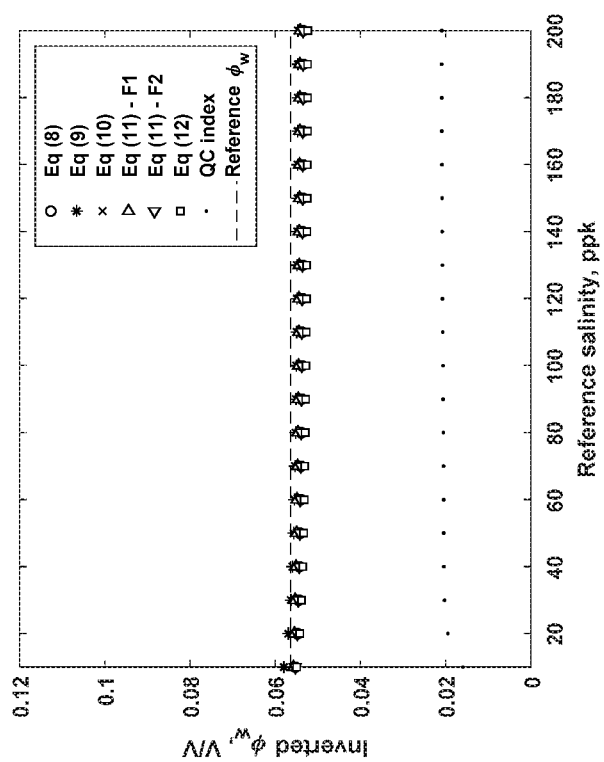
FIG. 3 is a plot of water-filled porosity values for different water salinities. The water-filled porosity values are solved by inversion modeling of multi-frequency dielectric dispersion data representing an organic shale sample according to equations (8)-(12) as set forth below. The true water-filled porosity value (labeled "Reference $\phi_w$") is shown as a dashed line, and values of a quality control index for different water salinities as calculated according to equation (17) as set forth below is shown as a dotted line.

A comparison of water-filled porosity derived from simulated data using equations (8)-(12) is shown in FIG. 3. A good agreement between the reference water-filled porosity and the water-filled porosity derived using equations (8)-(12) was obtained without having to determine and provide as an input the permittivities of the matrix and hydrocarbon phases (including kerogen) of the formation. The true water-filled porosity value is shown as a dashed line. It is evident that all equations produce a good estimate of the water-filled porosity for all water salinities with the equations (8)-(10) providing the closest match to the reference value.

Following the inequality of equation (13), a quality index can be defined as follows:

$$QI = \left|\text{Im}\left\{\frac{\sqrt{\varepsilon_2} - \sqrt{\varepsilon_1}}{\sqrt{\varepsilon_{w2}} - \sqrt{\varepsilon_{w1}}}\right\} / \text{Re}\left\{\frac{\sqrt{\varepsilon_2} - \sqrt{\varepsilon_1}}{\sqrt{\varepsilon_{w2}} - \sqrt{\varepsilon_{w1}}}\right\}\right|.\qquad\text{Eqn. (17)}$$

The method of equation (8) can be determined to be reliable and used for the case that QI<<1. The quality index QI is plotted for values of water salinity in FIG. 3. The QI value is around 0.02 which satisfies the condition QI<<1. Thus, in this case, the method of equation (8) can be determined to be reliable such that equation (8) can be used to solve for the water-filled porosity of the formation.

The interpretation methods based on equations (8)-(12) assume knowledge of water temperature, pressure, and water salinity. Water salinity is the salinity of the water that fills the water-filled porosity $\varphi_w$. Formation temperature and pressure are readily available from measurements provided by downhole sensors. Formation fluid pressure has a relatively small effect on the water dielectric properties.

In some cases, water salinity is available from prior and/or local knowledge. In cases when it is not known, one can then invert for water salinity by adding an extra dielectric measurement at a third frequency. In this case, inversion modeling an invert for DC resistivity of water and water temperature from the dielectric measurements of the formation at the three frequencies, the inversion modeling can use the Klein-Swift dispersion model (for example) to represent $\varepsilon_{w3}$, $\varepsilon_{w2}$ and $\varepsilon_{w1}$ in terms of the DC resistivity of water and water temperature and solve for DC resistivity of water and water temperature from the following equation:

$$\frac{\sqrt{\varepsilon_2} - \sqrt{\varepsilon_1}}{\sqrt{\varepsilon_3} - \sqrt{\varepsilon_2}} = \frac{\sqrt{\varepsilon_{w2}} - \sqrt{\varepsilon_{w1}}}{\sqrt{\varepsilon_{w3}} - \sqrt{\varepsilon_{w2}}}.\qquad\text{Eqn. (18)}$$

Alternative formulas for the inversion of DC resistivity of water and water temperature from the dielectric measurements are given by:

$$\frac{\text{Im}(\sqrt{\varepsilon_3})}{\text{Im}(\sqrt{\varepsilon_2})} = \frac{\text{Im}(\sqrt{\varepsilon_{w3}})}{\text{Im}(\sqrt{\varepsilon_{w2}})},\qquad\text{Eqn. (19)}$$

$$\frac{\text{Im}(\sqrt{\varepsilon_2})}{\text{Im}(\sqrt{\varepsilon_1})} = \frac{\text{Im}(\sqrt{\varepsilon_{w2}})}{\text{Im}(\sqrt{\varepsilon_{w1}})}, \text{ and}\qquad\text{Eqn. (20)}$$

$$\frac{\text{Im}(\sqrt{\varepsilon_3})}{\text{Im}(\sqrt{\varepsilon_1})} = \frac{\text{Im}(\sqrt{\varepsilon_{w3}})}{\text{Im}(\sqrt{\varepsilon_{w1}})}.\qquad\text{Eqn. (21)}$$

Once values for the DC resistivity of water and water temperature are determined, such values can be used to calculate a value for water salinity of the formation, for example, using the relation of equation (4).

Figure 4:
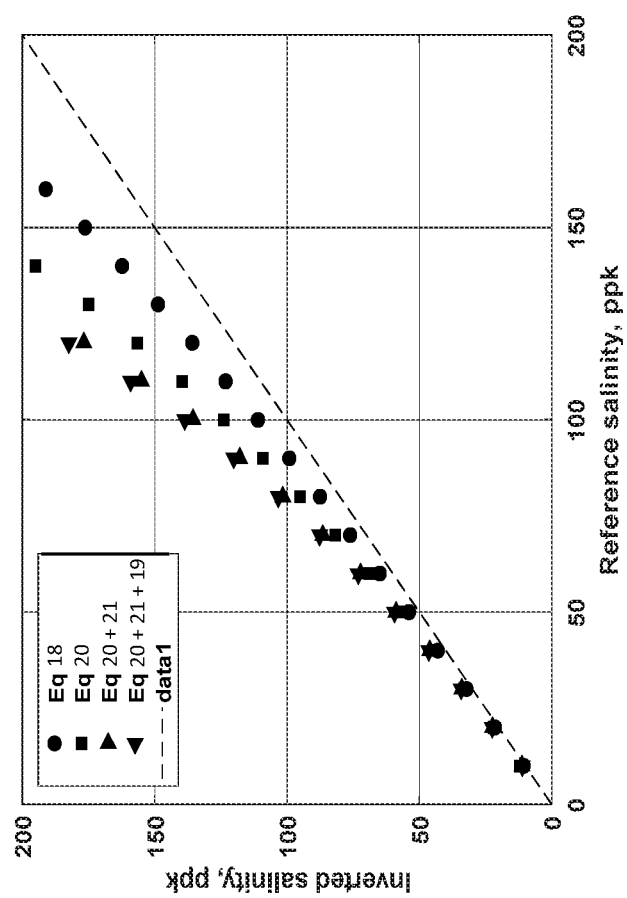
FIG. 4 depicts a plot of water salinity values as a function of reference water salinity. The water salinity values are solved by a number of different inversion operations that employ simulated multi-frequency dielectric dispersion data representing an organic shale sample as a function of reference water salinity. The inversion operations are based on different equations and combination of equations as described herein. All the inversion operations produce a good estimate of the water salinity at lower salinities.

Note that equations (19)-(21) require only two frequencies each as compared to equation (18) that requires three frequencies. The methods for determining water salinity of the formation according to equations (18)-(21) are demonstrated on synthetic dielectric dispersion data shown in FIGS. 2A and 2B. Permittivity and conductivity data corresponding to three frequencies in the range of 100 MHz-1 GHz were used to demonstrate the methods described by the equations (18)-(21). The highest frequency is designated as $f_1$, the intermediate frequency is designated as $f_2$ and the lowest frequency is designated as $f_3$. The results of the inversion of water salinity are shown in FIG. 4. We tested equation (18) that uses all three frequencies, equation (20) that uses two highest frequencies, then we combined equation (20) with equation (21) and found water salinity that satisfies both equations. In addition, we combined equation (20) with equation (21) and equation (19) and found water salinity that satisfies all three equations. The dashed line is the 45° line. The inverted salinity will lie on this dashed line if it is equal to the reference (true) salinity, it will lie above the dashed line if it is overestimated and will lie below the dashed line if it is underestimated.

All of the equations (18)-(21) provided a good estimate of water salinity for low salinities. Equation (18) produces a reasonable estimate of the water salinity sufficient to determine the water filled porosity with methods described by equations (8)-(12) for all water salinities. The water salinity input for equations (8)-(12) only needs to be approximately known and the estimate provided by the equation (18) for the studied datasets is sufficiently accurate to determine water-filled porosity with equations (8)-(12).

If the number of measurement frequencies is further increased, an additional combination of the measured permittivities is possible following the approach of equation (9) or equations (10)-(12). For example, if a fourth measurement frequency is added, then the following measurement frequency combinations can be used to realize the approach of equation (9): 1-2-3, 1-2-4, 1-3-4, 2-3-4. For the approach of equations (10)-(12), the fourth measurement frequency will allow the following combinations: 1-2, 1-3, 1-4, 2-3, 2-4, 3-4.

Once the DC resistivity of water and its temperature are estimated, one can then compute values of $\varepsilon_{w2}$, and $\varepsilon_{w1}$, again, from the Klein-Swift model. Finally, the water-filled porosity can be estimated from any of the equations (8)-(12) using any two measurement frequency combinations.

The combined values of $\phi_{hc}\sqrt{\varepsilon_{hc}}+\phi_m\sqrt{\varepsilon_m}$ can then be computed from:

$$\phi_{hc}\sqrt{\varepsilon_{hc}}+\phi_m\sqrt{\varepsilon_m}=\sqrt{\varepsilon}-\phi_w\sqrt{\varepsilon_w}, \qquad \text{Eqn. (22)}$$

at any of the three frequencies ($f_1, f_2, f_3$), which will then allow the generation of the full dispersion curve from:

$$\sqrt{\phi_{eff}}=\phi_w\sqrt{\varepsilon_w}+\phi_{hc}\sqrt{\varepsilon_{hc}}+\phi_m\sqrt{\varepsilon_m}. \qquad \text{Eqn. (23)}$$

The above analysis is based on the CRIM law. Other models can be used. With more complicated mixing laws or models and their associated increased number of parameters, additional frequencies may be needed.

The methods above are equally applicable to a generalized CRIM law given below, if an assumption is made on the value of the tortuosity-cementation exponent m or inverting for m using additional frequencies.

$$(\varepsilon_{eff})^{\frac{1}{m}} = \phi_w(\varepsilon_w)^{\frac{1}{m}} + \phi_{hc}(\varepsilon_{hc})^{\frac{1}{m}} + \phi_m(\varepsilon_m)^{\frac{1}{m}}. \qquad \text{Eqn. (24)}$$

This can be achieved by applying the above method with m=2 to get the water-filled porosity and water salinity. Then, an additional frequency is added to invert for the tortuosity-cementation exponent m using the above generalized CRIM formula. The solved-for tortuosity-cementation exponent m characterizes the tortuosity of the water-filled pore space of the formation. Tortuosity-cementation exponent m is a parameter in Archie's law that relates electrical conductivity of fully brine-saturated rock ($\sigma_0$) to its porosity ($\phi$) and the brine conductivity ($\sigma_w$) as follows: $\sigma_0=\sigma_w/F$. Here $F=\phi^{-m}$ is referred to as the formation factor and is related to the electrical tortuosity ($\alpha$) defined as $\alpha=F\phi=\phi^{1-m}$, which is described in R. J. S. Brown, 1980, "Connection between formation factor for electrical resistivity and fluid-solid coupling factor in Biots' equations for acoustic waves in fluid-filled porous media", Geophysics 45(8), pp.1269-1275; and Amyx, J. W., Bass Jr., D. M., Whiting, R. L., 1960. Petroleum Reservoir Engineering. McGraw-Hill Book Co., New York.

Figure 5:
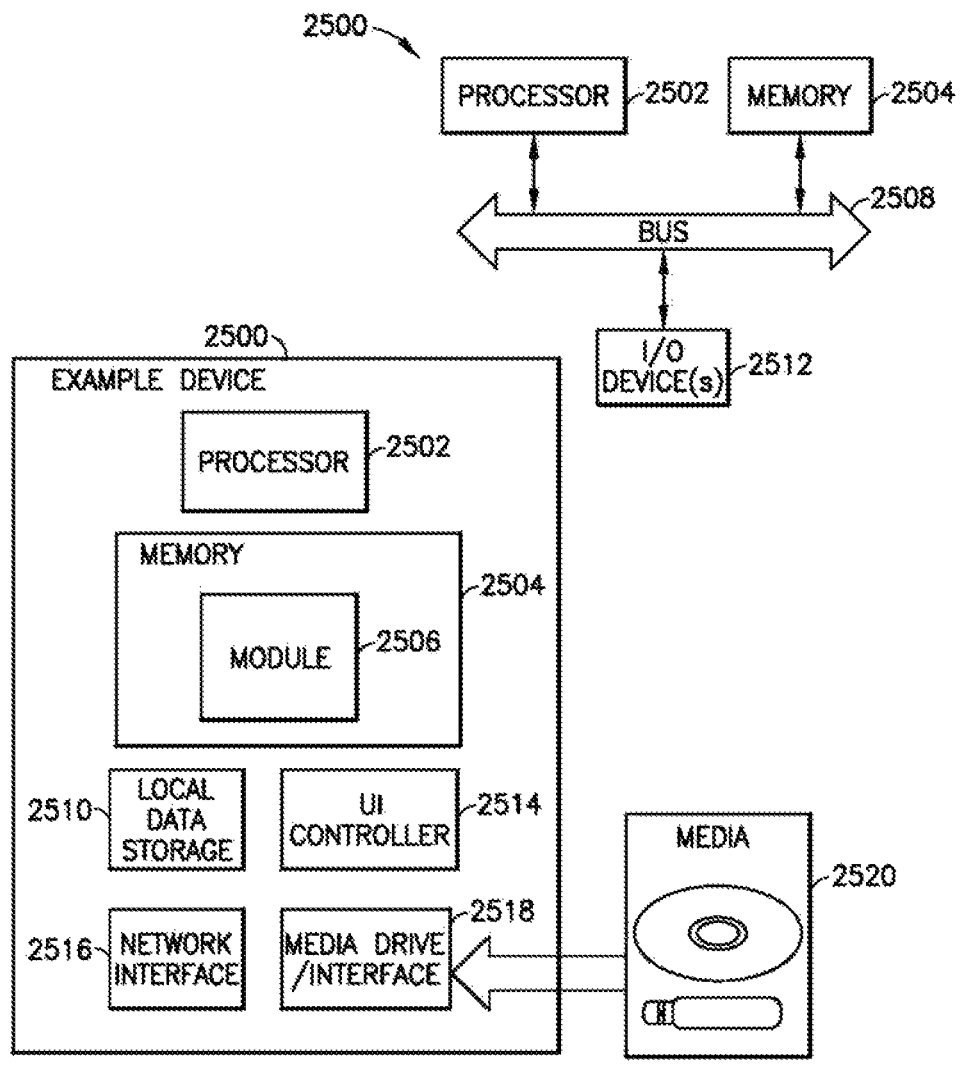
FIG. 5 is a block diagram of a computer processing system, which can be used to embody parts of the methodology for quantification of formation water-filled porosity and water saturation and other useful formation properties as described herein.

FIG. 5 illustrates an example device 2500, with a processor 2502 and memory 2504 that can be configured to implement various embodiments of the methods and workflows as discussed in this disclosure. Memory 2504 can also host one or more databases and can include one or more forms of volatile data storage media such as random-access memory (RAM), and/or one or more forms of nonvolatile storage media (such as read-only memory (ROM), flash memory, and so forth.

Device 2500 is one example of a computing device or programmable device and is not intended to suggest any limitation as to scope of use or functionality of device 2500 and/or its possible architectures. For example, device 2500 can comprise one or more computing devices, programmable logic controllers (PLCs), etc.

Further, device 2500 should not be interpreted as having any dependency relating to one or a combination of components illustrated in device 2500. For example, device 2500 may include one or more of computers, such as a laptop computer, a desktop computer, a mainframe computer, etc., or any combination or accumulation thereof.

Device 2500 can also include a bus 2508 configured to allow various components and devices, such as processors 2502, memory 2504, and local data storage 2510, among other components, to communicate with each other.

Bus 2508 can include one or more of any of several types of bus structures, including a memory bus or memory controller, a peripheral bus, an accelerated graphics port, and a processor or local bus using any of a variety of bus architectures. Bus 2508 can also include wired and/or wireless buses.

Local data storage 2510 can include fixed media (e.g., RAM, ROM, a fixed hard drive, etc.) as well as removable media (e.g., a flash memory drive, a removable hard drive, optical disks, magnetic disks, and so forth).

One or more input/output (I/O) device(s) 2512 may also communicate via a user interface (UI) controller 2514, which may connect with I/O device(s) 2512 either directly or through bus 2508.

In one possible implementation, a network interface 2516 may communicate outside of device 2500 via a connected network.

A media drive/interface 2518 can accept removable tangible media 2520, such as flash drives, optical disks, removable hard drives, software products, etc. In one possible implementation, logic, computing instructions, and/or software programs comprising elements of module 2506 may reside on removable media 2520 readable by media drive/interface 2518.

In one possible embodiment, input/output device(s) 2512 can allow a user (such as a human annotator) to enter commands and information to device 2500, and also allow information to be presented to the user and/or other components or devices. Examples of input device(s) 2512 include, for example, sensors, a keyboard, a cursor control device (e.g., a mouse), a microphone, a scanner, and any other input devices known in the art. Examples of output devices include a display device (e.g., a monitor or projector), speakers, a printer, a network card, and so on.

Various processes of present disclosure may be described herein in the general context of software or program modules, or the techniques and modules may be implemented in pure computing hardware. Software generally includes routines, programs, objects, components, data structures, and so forth that perform particular tasks or implement particular abstract data types. An implementation of these modules and techniques may be stored on or transmitted across some form of tangible computer-readable media. Computer-readable media can be any available data storage medium or media that is tangible and can be accessed by a computing device. Computer readable media may thus comprise computer storage media. "Computer storage media" designates tangible media, and includes volatile and non-volatile, removable and non-removable tangible media implemented for storage of information such as computer readable instructions, data structures, program modules, or other data.

Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information, and which can be accessed by a computer.

Some of the methods and processes described above, can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, or general-purpose computer) for executing any of the methods and processes described above.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

All references, including publications, patent applications and patents, cited herein are hereby incorporated by reference to the same extent as if each reference were individually and specifically indicated to be incorporated by reference and were set forth in its entirety herein.

There have been described and illustrated herein several embodiments of methods and systems for measuring permittivity dispersion data of a formation from downhole electromagnetic measurements and estimating water-filled porosity and water saturation of the formation. Other useful formation properties (such as formation water salinity) can be determined. It will therefore be appreciated by those skilled in the art that yet other modifications could be made to the provided invention without deviating from its spirit and scope as claimed.

What is claimed is:

1. A method for characterizing a geological formation, comprising:
    using a downhole logging device to perform multifrequency electromagnetic measurements of the geological formation;
    determining a plurality of complex permittivities of the geological formation at a plurality of frequencies from the multifrequency electromagnetic measurements, wherein the plurality of frequencies comprise two frequencies $f_2$ and $f_1$;
    determining a plurality of complex permittivities of water in the geological formation at the plurality of frequencies from the multifrequency electromagnetic measurements; and
    determining a value of at least one formation parameter from the plurality of complex permittivities of the geological formation and the plurality of complex permittivities of water in the geological formation, wherein the at least one formation parameter is selected from the group consisting of water-filled porosity of the geological formation, water salinity, water saturation, tortuosity of water-filled pore space, and combinations thereof, and wherein determining the value of the at least one formation parameter from the plurality of the complex permittivities of the geological formation and the plurality of complex permittivities of water in the geological formation comprises selectively determining a value of the water-filled porosity based on evaluation of a quality index derived from a real part and an imaginary part of an expression involving the plurality of complex permittivities of the geological formation and the plurality of complex permittivities of water in the geological formation at the two frequencies $f_2$ and $f_1$.

2. The method of claim 1, wherein:
    the plurality of complex permittivities of the geological formation, the plurality of complex permittivities of water in the geological formation and the value of the at least one formation parameter are determined by a processor.

3. The method of claim 1, wherein:
    the geological formation comprises organic shale; and
    the value of the at least one formation parameter is determined from the plurality of complex permittivities of the geological formation and the plurality of complex permittivities of water in the geological formation without determining or providing as input information characterizing mineralogy and hydrocarbon content including kerogen of the geological formation.

4. The method of claim 1, wherein:
    the at least one formation parameter comprises the water-filled porosity whose value is determined according to an expression suitable for a known or calculated water salinity of the geological formation.

5. The method of claim 1, wherein:
    the at least one formation parameter comprises the water-filled porosity whose value is determined from only a real part of at least one expression involving the plurality of complex permittivities of the geological formation and the plurality of complex permittivities of water in the geological formation at the two frequencies $f_2$ and $f_1$.

6. The method of claim 1, wherein:
    the at least one formation parameter comprises the water-filled porosity whose value is determined according to expression $$\varphi_w = \operatorname{Re}\left\{ \frac{\sqrt{\varepsilon_2} - \sqrt{\varepsilon_1}}{\sqrt{\varepsilon_{w2}} - \sqrt{\varepsilon_{w1}}} \right\},$$

where $\varphi_w$ represents the value of the water-filled porosity,
    $\varepsilon_2$ and $\varepsilon_1$ are the plurality of complex permittivities of the geological formation at the two frequencies $f_2$ and $f_1$, respectively,
    $\varepsilon_{w2}$ and $\varepsilon_{w1}$ are the plurality of complex permittivities of water in the geological formation at the two frequencies $f_2$ and $f_1$, respectively, and
    Re { } represents a real part of an expression involving the plurality complex permittivities of the geological formation and the plurality of complex permittivities of water in the geological formation at the two frequencies $f_2$ and $f_1$.

7. The method of claim 6, further comprising:
    selectively determining the value of the water-filled porosity according to the expression of claim 6 based on the evaluation of the quality index derived from the real part and the imaginary part of the expression involving the plurality of complex permittivities of the geological formation and the plurality of complex permittivities of water in the geological formation at the two frequencies $f_2$ and $f_1$.

8. The method of claim 7, wherein:
    the quality index has the form $$QI = \left| \operatorname{Im}\left\{ \frac{\sqrt{\varepsilon_2} - \sqrt{\varepsilon_1}}{\sqrt{\varepsilon_{w2}} - \sqrt{\varepsilon_{w1}}} \right\} \bigg/ \operatorname{Re}\left\{ \frac{\sqrt{\varepsilon_2} - \sqrt{\varepsilon_1}}{\sqrt{\varepsilon_{w2}} - \sqrt{\varepsilon_{w1}}} \right\} \right|,$$

where QI represents a value of the quality index,
    $\varepsilon_2$ and $\varepsilon_1$ are the plurality of complex permittivities of the geological formation at the two frequencies $f_2$ and $f_1$, respectively,
    $\varepsilon_{w2}$ and $\varepsilon_{w1}$ are the plurality of complex permittivities of water in the geological formation at the two frequencies $f_2$ and $f_1$, respectively,
    Re { } represents the real part of the expression involving the plurality of complex permittivities of the geological formation and the plurality of complex permittivities of water in the geological formation at the two frequencies $f_2$ and $f_1$,
    Im{ } represents an imaginary part of the expression involving the plurality of complex permittivities of the geological formation and the plurality of complex permittivities of water in the geological formation at two frequencies $f_2$ and $f_1$, and
    |{ }| represents an absolute value.

9. The method of claim 1, wherein:
    the at least one formation parameter comprises the water-filled porosity whose value is determined according to expression $$\varphi_w = \frac{\operatorname{Re}\{\sqrt{\varepsilon_2} - \sqrt{\varepsilon_1}\}}{\operatorname{Re}\{\sqrt{\varepsilon_{w2}} - \sqrt{\varepsilon_{w1}}\}},$$

where $\varphi_w$ represents the value of the water-filled porosity, $\varepsilon_2$ and $\varepsilon_1$ are the plurality of complex permittivities of the geological formation at the two frequencies $f_2$ and $f_1$, respectively, $\varepsilon_{w2}$ and $\varepsilon_{w1}$ are the plurality of complex permittivities of water in the geological formation at the two frequencies $f_2$ and $f_1$, respectively, and Re { } represents a real part of expressions involving the plurality of complex permittivities of the geological formation and the plurality of complex permittivities of water in the geological formation at the two frequencies $f_2$ and $f_1$.

10. The method of claim 1, wherein:
the at least one formation parameter comprises the water-filled porosity whose value is determined from an imaginary unit part of at least one expression involving the plurality of complex permittivities of the geological formation and the plurality of complex permittivities of water in the geological formation at the two frequencies $f_2$ and $f_1$.

11. The method of claim 1, wherein:
the at least one formation parameter comprises the water-filled porosity whose value is determined according to expression $$\varphi_w = \frac{\text{Im}\{\sqrt{\varepsilon_2} - \sqrt{\varepsilon_1}\}}{\text{Im}\{\sqrt{\varepsilon_{w2}} - \sqrt{\varepsilon_{w1}}\}},$$

where $\varphi_w$ represents the value of the water-filled porosity, $\varepsilon_2$ and $\varepsilon_1$ are the plurality of complex permittivities of the geological formation at the two frequencies $f_2$ and $f_1$, respectively, $\varepsilon_{w2}$ and $\varepsilon_{w1}$ are the plurality of complex permittivities of water in the geological formation at the two frequencies $f_2$ and $f_1$, respectively, and Im { } represents an imaginary part of expressions involving the plurality of complex permittivities of the geological formation and the plurality of complex permittivities of water in the geological formation at the two frequencies $f_2$ and $f_1$.

12. The method of claim 1, wherein:
the at least one formation parameter comprises the water-filled porosity whose value is determined from an absolute value of an expression involving the plurality of complex permittivities of the geological formation and the plurality of complex permittivities of water in the geological formation at the two frequencies $f_2$ and $f_1$.

13. The method of claim 1, wherein:
the at least one formation parameter comprises the water-filled porosity whose value is determined according to expression $$\varphi_w = \left| \frac{\sqrt{\varepsilon_2} - \sqrt{\varepsilon_1}}{\sqrt{\varepsilon_{w2}} - \sqrt{\varepsilon_{w1}}} \right|,$$

where $\varphi_w$ represents the value of the water-filled porosity, $\varepsilon_2$ and $\varepsilon_1$ are the plurality of complex permittivities of the geological formation at the two frequencies $f_2$ and $f_1$, respectively, $\varepsilon_{w2}$ and $\varepsilon_{w1}$ are the plurality of complex permittivities of water in the geological formation at the two frequencies $f_2$ and $f_1$, respectively, and

|{ }| represents an absolute value of the expression involving the plurality of complex permittivities of the geological formation and the plurality of complex permittivities of water in the geological formation at the two frequencies $f_2$ and $f_1$.

14. The method of claim 1, wherein:
the plurality of frequencies comprise at least three frequencies.

15. The method of claim 14, wherein:
the at least one formation parameter comprises the water salinity whose value is determined from the plurality of complex permittivities of the geological formation at the at least three frequencies and the plurality of complex permittivities of water in the geological formation at the at least three frequencies.

16. The method of claim 15, wherein:
the value of the water salinity is determined from an inversion operation that uses a dispersion model to represent the plurality of complex permittivities of water in the geological formation at the at least three frequencies in terms of a direct current DC resistivity of water and water temperature, and solves for the DC resistivity of water and the water temperature.

17. The method of claim 16, wherein:
the inversion operation solves for the DC resistivity of water and the water temperature using at least one of expressions $$\frac{\sqrt{\varepsilon_2} - \sqrt{\varepsilon_1}}{\sqrt{\varepsilon_3} - \sqrt{\varepsilon_2}} = \frac{\sqrt{\varepsilon_{w2}} - \sqrt{\varepsilon_{w1}}}{\sqrt{\varepsilon_{w3}} - \sqrt{\varepsilon_{w2}}},$$

$$\frac{\text{Im}(\sqrt{\varepsilon_3})}{\text{Im}(\sqrt{\varepsilon_2})} = \frac{\text{Im}(\sqrt{\varepsilon_{w3}})}{\text{Im}(\sqrt{\varepsilon_{w2}})},$$

$$\frac{\text{Im}(\sqrt{\varepsilon_2})}{\text{Im}(\sqrt{\varepsilon_1})} = \frac{\text{Im}(\sqrt{\varepsilon_{w2}})}{\text{Im}(\sqrt{\varepsilon_{w1}})}, \text{ and}$$

$$\frac{\text{Im}(\sqrt{\varepsilon_3})}{\text{Im}(\sqrt{\varepsilon_1})} = \frac{\text{Im}(\sqrt{\varepsilon_{w3}})}{\text{Im}(\sqrt{\varepsilon_{w1}})}.$$

where $\varepsilon_3$, $\varepsilon_2$ and $\varepsilon_1$ are the plurality of complex permittivities of the geological formation at the at least three frequencies $f_3$, $f_2$ and $f_1$, respectively, $\varepsilon_{w3}$, $\varepsilon_{w2}$ and $\varepsilon_{w1}$ are the plurality of complex permittivities of water in the geological formation at the at least three frequencies $f_3$, $f_2$ and $f_1$, respectively, and Im { } represents an imaginary part of the at least one of the expressions involving the plurality of complex permittivities of the geological formation and the plurality of complex permittivities of water in the geological formation at the at least three frequencies $f_3$, $f_2$ and $f_1$, respectively.

18. The method of claim 1, wherein:
the at least one formation parameter comprises the water-filled porosity and the water saturation, wherein the water saturation is determined from a ratio of the water-filled porosity and a total porosity of the geological formation, wherein the total porosity of the geological formation is determined from other measurements.

19. The method of claim 1, wherein:
the at least one formation parameter comprises a parameter that characterizes the tortuosity of water-filled pore space which is determined by inversion operations using dielectric data derived from the multifrequency electromagnet measurements.

20. A method for characterizing a geological formation, comprising:
using a downhole logging device to perform multifrequency electromagnetic measurements of the geological formation;
determining a plurality of complex permittivities of the geological formation at a plurality of frequencies from the multifrequency electromagnetic measurements, wherein the plurality of frequencies comprise two frequencies $f_2$ and $f_1$;
determining a plurality of complex permittivities of water in the geological formation at the plurality of frequencies from the multifrequency electromagnetic measurements; and
determining a value of at least one formation parameter from the plurality of complex permittivities of the geological formation and the plurality of complex permittivities of water in the geological formation, wherein the at least one formation parameter is selected from the group consisting of water-filled porosity of the geological formation, water salinity, water saturation, tortuosity of water-filled pore space, and combinations thereof, and wherein the at least one formation parameter comprises the water-filled porosity whose value is determined from an absolue value of an expression involving the plurality of complex permittivities of the geological formation and the plurality of complex permittivities of water in the geological formation at the two frequencies $f_2$ and $f_1$.

* * * * *